Oct. 1, 1963

W. POWELL 3,105,751

TREATER FOR WELL FLUIDS

Filed Aug. 31, 1961

Wesley Powell
INVENTOR.

BY Hayden & Pravel

ATTORNEYS

United States Patent Office 3,105,751
Patented Oct. 1, 1963

3,105,751
TREATER FOR WELL FLUIDS
Wesley Powell, Houston, Tex., assignor to Texas Gulf Tank Company, Houston, Tex., a corporation
Filed Aug. 31, 1961, Ser. No. 135,374
5 Claims. (Cl. 55—175)

The present invention relates to a treating vessel, and more particularly, to a treating vessel which enables a plurality of flow streams to be simultaneously treated for effecting removal of desired constituents therefrom, while retaining the recovered constituents in each flow stream separate.

In more recent years, considerably more petroleum products, such as oil and gas, are being produced over water covered areas, both over inland water areas, as well as offshore. It can be appreciated that platform space at the wellhead in any type of water location is relatively expensive, thereby necessitating the most efficient utilization of a minimum amount of space.

Also, it is not unusual for a plurality of wells to be completed from the same location, with all of such wells or producing areas having various flow equipment mounted on the same platform. By State law in most States, separate production figures must be kept on each well, or upon each producing strata in a well; therefore it is necessary that each flow stream be metered or gauged before entering a collection tank, or before being mingled with oil from other producing areas. Equipment and processes heretofore employed in the handling and treatment of flow streams require that the flow stream with oil be metered prior to conducting it to a storage vessel.

The present invention provides an apparatus which enables a plurality of flow streams to be simultaneously treated to enable the separation of desired constituents in each stream, with the desired recovered constituents of each stream being retained separated so that the production capacity, at least as to certain of the constituents in each flow stream, may be determined or gauged after the constituents have been recovered.

Still another object of the present invention is to provide a compact treater for a well flow stream which enables a plurality of well flow streams to be simultaneously treated to separate the water, oil, and gas while retaining the oil recovered from each flow stream separated from the oil recovered from any of the other flow streams.

Another important object of the present invention is to provide a treatment vessel wherein a plurality of flow streams from wells or other sources are treated to separate the oil from each flow stream and to maintain such oil so separated in separate streams at all times while the water from such plurality of flow streams is combined and heated as a single mass for transmitting heat to the oil and oil-water emulsion to accomplish separation of the water from the oil and the emulsion.

Yet a further object of the present invention is to provide a treatment vessel for receiving a plurality of well flow streams whereby the water and gas may be separated from the oil in each stream, and the oil in each stream individually collected, means for maintaining a predetermined level of water in the vessel as it is separated from the oil while discharging any excess water over and above the predetermined desired amount, and additional means for discharging the separated oil of each flow stream to an individual or separate collection point.

Still a further object of the present invention is to provide a construction and arrangement of a treatment vessel for receiving a plurality of flow streams from oil and gas wells to enable the oil to be separated from the gas and from any water present in the flow streams, the treating vessel including a plurality of upper compartments for receiving each flow stream, a plurality of lower compartments, conduit means connecting the upper and lower compartments, means surrounding the discharge end of said conduit means whereby any water in the liquid stream is separated by gravity from the oil and discharged out the lower end of said means, with the oil being discharged through the upper end of said means into the lower compartments for collection and discharge from the treater.

Other objects and advantages of the present invention will become more readily apparent from consideration of the following description and drawings wherein:

FIG. 4 is a sectional view on the line 4—4 of FIG. 2 which shows the relationship of the lower end of the conduits and the open ended chambers or wells into which said conduits discharge liquid; and FIG. 5 is a partial sectional view on the line 5—5 of FIG. 2 to further illustrate the arrangement of the lower compartments.

Figure 2:
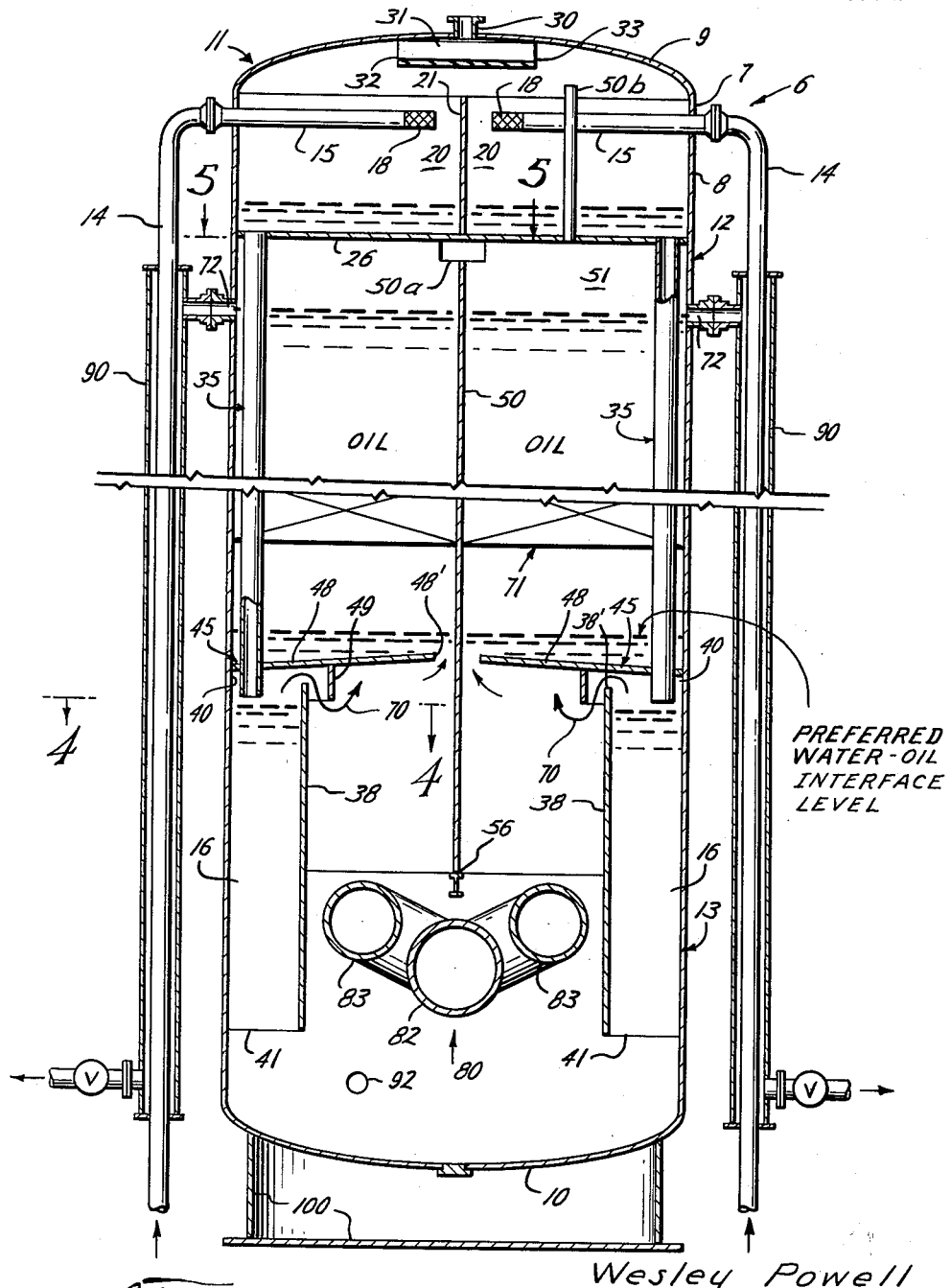
FIG. 2 is a vertical sectional view on the line 2—2 of FIG. 1 to more clearly illustrate the structural details of the treater including the upper compartments, lower compartments, as well as the conduit means and baffle means arranged in the treater for separation and collection of the various constituents.

Attention is first directed to FIG. 2 of the drawings wherein the treater of the present invention is referred to generally by the numeral 6. The treater 6 includes a housing 7 formed of side wall 8, an upper end wall 9, and a lower end wall 10, thus providing a substantially closed housing with openings therein for ingress and egress of liquids and fluids in a manner as will be described in greater detail hereinafter. As illustrated in the drawings, the housing 7 is shown as being cylindrical, but it can be appreciated that the configuration and shape of the housing may assume any desired form without departing from the scope of the present invention. Also, as illustrated in the drawings, it will be noted that the housing 7 is arranged in a vertical position so that the end wall 9 forms the upper end of the housing 7 and the end wall 10 forms the lower end wall.

Generally speaking, the vessel 6 is separated into a portion represented by the numeral 11 which may be termed the upper compartment portion; the portion thereabeneath designated generally by the numeral 12 which may be designated as the lower compartment portion; the portion designated generally by the numeral 13 in the bottom part of the housing 7 which may be referred to as the vessel section for the collection and heating of water.

Figure 1:
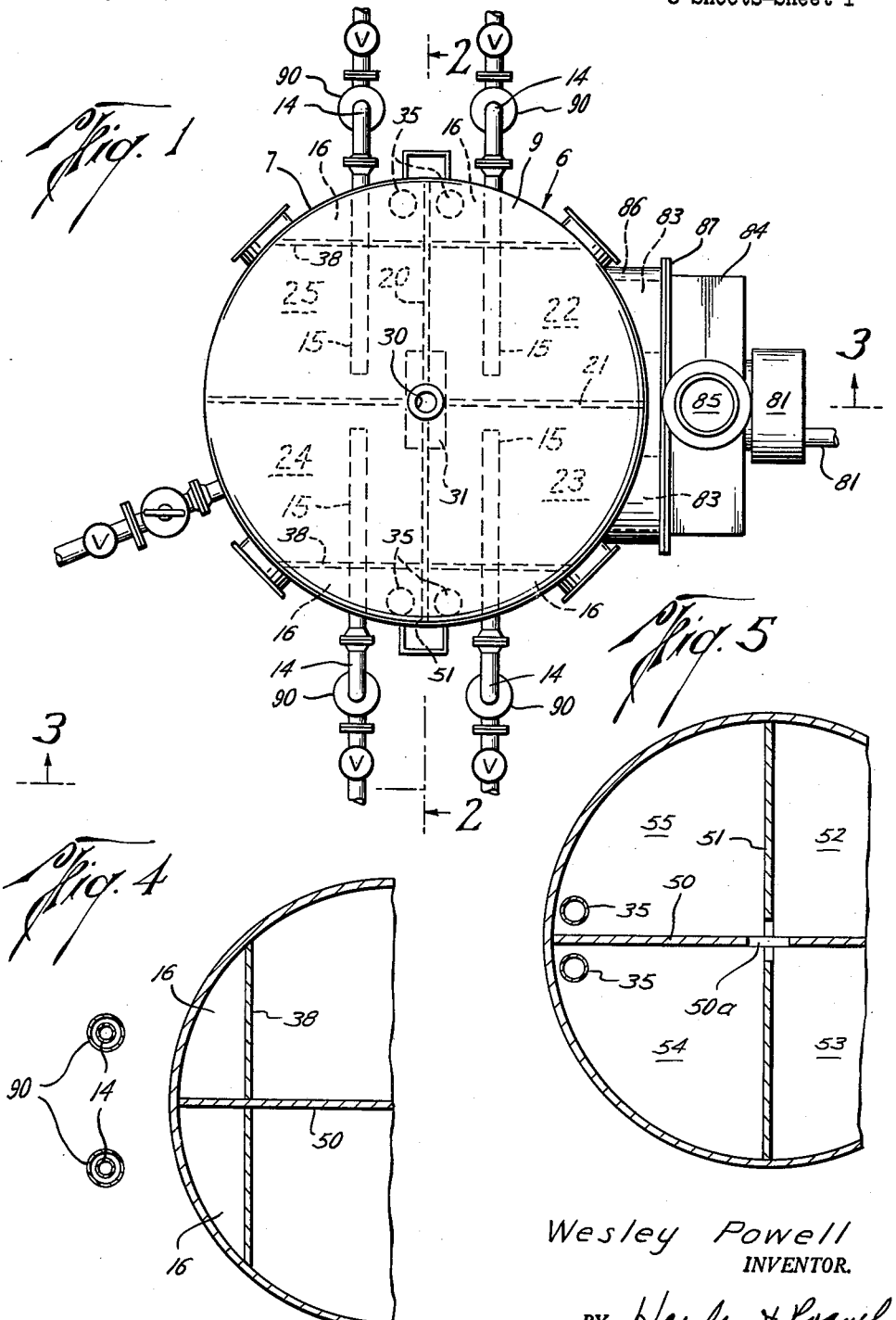
FIG. 1 is a top plan view illustrating the preferred embodiment of the invention.

A plurality of inlets as best illustrated in FIG. 1 at 14 are provided for conducting petroleum liquids into the treater 6. It can be appreciated that each of the conduits 14 is connected to the flow line from a producing well, or with the line connected to a producing formation in a well so that the well liquids conveyed through the lines 14 and discharged into the treater 6 each come from a separate well, or from a separate producing formation. It can be appreciated that while four conduits 14 are shown as being utilized for conducting petroleum liquids to the treating vessel 6, any suitable number of flow streams may be connected into the treater 6 without departing from the scope of the invention; however, in such event, the treater 6 would be modified so that a separate upper compartment, a separate lower compartment, and other components of the treater 6 would be arranged accordingly so that one producing well, or one producing formation, is flowed into each separate compartment to thereby retain the recovered oil separated in a manner as will be described in greater detail hereinafter.

As shown in FIG. 2 of the drawings, the conduits 14 are each connected into the housing 7 at their upper end by means of the pipes 15 which extend through the side wall 8 of the housing 7. The pipes 15 extend inwardly into the upper part of the housing 7 a suitable distance, as best illustrated in FIG. 2, whereby the petroleum liquids may be discharged into the housing through the screen, or foraminated covering material 18 positioned on the end of each of the pipes 15.

The upper compartment portion 11 of the treater 6 is formed by a plurality of wall surface means which are mounted in the housing 7 by any suitable means such as welding to form the desired number of compartments. As shown in FIGS. 1 and 2, the wall means includes the vertically arranged central plate or divider 20 and the vertical central plate 21 which bisect each other so that the upper compartment portion 11 of the vessel 6 illustrated in the drawings is formed into four compartments 22, 23, 24 and 25. The horizontal partition 26 forms the bottom of the compartments 22, 23, 24 and 25. It will be further noted that one conduit 14 is directed to each compartment whereby the flow from the various wells or various producing formations are maintained separate.

Also, the inlet pipes 14 are mounted in housing 7 so that liquid discharged therefrom falls downwardly into the respective compartments with which each of the conduits 14 communicate. This construction aids in removing any gaseous constituents from the liquid flow streams entering the treater 6, which gaseous constituents flow upwardly in the housing 7 to be discharged through the outlet 30. A mist separator 31 is connected at the outlet 30 on the inside of the upper end of 9 of the housing 7 so as to trap liquid in fine mist form which may be entrained in the gas passing to such outlet 30. The baffle 31 may assume any suitable form and as illustrated in the drawings is in the form of a cylinder which preferably has knitted wire mesh (not shown) at each end 32 and 33 for providing a large surface area per unit volume. Such large surface area of contact causes the mist droplets to coalesce until they become large enough to fall downwardly against the rising gas stream.

The compartments 22, 23, 24 and 25 are open at their upper end, whereby any liquids removed from the gas may fall back down into such compartments.

In the compartments 22, 23, 24 and 25, the liquid is maintained as a very thin layer to accomplish a degassing of the oil in such compartments. The depth or height of the liquid in the compartments 22, 23, 24 and 25 is therefore only sufficient to assure continued flow into downcomer pipes 35.

The oil and other liquids, primarily water, are discharged from each compartment through the downcomer tubes or means designated generally at 35. It will be noted that a downcomer tube is connected through the bottom partition 26 of each upper compartment 22, 23, 24 and 25 and extends longitudinally of the housing 7 as illustrated in FIG. 2 of the drawings.

Open ended chambers 16 are formed in the lower compartment portion 12 so as to receive the discharge from each of the downcomer tube means 35, such open ended chambers being formed by means of the partition 38 which extends vertically and longitudinally of the housing 7 as shown more clearly in FIGS. 2 and 4. The partition 38 is connected at each end to the cylindrical side 8 of the housing 7 as shown in FIG. 4 so that the chambers 16 communicate at their open upper end 40 with the lower compartment portion 12 of the housing 7, and also communicate with the bottom portion of the housing 7 through the lower open end 41. A deflector or baffle means designated generally at 45 is provided in the housing 7 and arranged relative to the open upper end 40 of each of the chambers 16 so as to direct the flow from the upper open end 40 of each chamber 16 in a desired manner as will be described in greater detail hereinafter.

More particularly, the deflector means 45 includes the plate 48 extending radially from the wall 8 of housing 7 and is slightly inclined upwardly towards the center of the housing 7. A downwardly extending portion 49 is radially spaced relative to the upper end 38' of the partition 38 and extends downwardly in the housing below the upper end 38' of each of said partitions to direct the flow from the chambers in a particular manner. A baffle means 45 is provided for each chamber, and since there are four chambers 16 arranged in pairs as illustrated in the drawings, they are two baffle means 45.

It will be noted that the outer end 48' of the radially and upwardly extending deflector plate 48 terminates at a point spaced inwardly slightly from the center of the housing and spaced from the vertical plate 50 to further aid in directing the liquids in a particular manner to enhance the separation of the oil and water from each other.

The lower compartment portion 12 of the housing 7 is formed by the vertical partition members 50 and 51 which extend longitudinally of the housing to divide the housing into the lower compartments as illustrated in FIG. 5 of the drawings. It will be noted that the lower compartment portion 12 is constructed and arranged so that liquid from each one of the upper compartments is directed through each downcomer 35 into the upper part of the open ended chambers 16. Each downcomer communicates with only one chamber 16. The liquid is separated by gravity in the chambers 16 so that the oil flows out through the upper open end 40 and then up into the particular lower compartment which communicates with that chamber 16. The oil collects here until it is discharged through outlet 72. As shown in the drawings, there are four lower compartments 52, 53, 54 and 55, and as previously noted, there are four upper compartments; however, any suitable number of compartments may be provided for receiving flow from a desired number of sources. It will be noted that the partitions 50 and 51 forming the lower compartment portion 12 in the housing 7 terminate at a point as illustrated at 56 spaced above the bottom end wall 10 whereby water discharged through the lower open end 41 of the chambers or wells 16 is co-mingled in the bottom portion 13 of the housing 7.

From the foregoing description, it can be seen that the housing 7 is divided into a plurality of upper compartments into which fluid including liquids and gas are received from a plurality of sources. One flow stream is conducted into each upper compartment, and after the gas is separated for discharge through a common outlet, the flow streams are separately conducted through conduit means 35 which communicate at their lower end in the upper end of a chamber 16 formed in the housing 7 by suitable partition means 38. The liquid discharged from the downcomer means 35 into its respective open ended chamber 16 is separated by gravity so that the oil flows out of the top 40 of each chamber 16, and water is discharged through the lower open end 41 of the chamber 16.

The oil separated from the water strikes the plate 48 of the deflector means 45 and is guided in the circuitous path by the plates 48 and 49, such circuitous path being indicated by the numeral 70.

It will be further noted that an open ended chamber or well 16 is provided for each downcomer tube 35 stream, and that the oil separated from each flow stream flows into a separate compartment in the lower compartmented portion 12 of the housing 7. The oil flows out of the top 40 of the chamber 16 and along the deflectors 48 and 49 to discharge through the opening formed between the end 48' of the deflector 48 and the vertical partitions 50 and 51 forming the lower compartment portion 12 of the housing 7. The oil then flows upwardly into the lower compartmented portion 12. To further aid in separating any water present in the oil, suitable filter means may be provided in the lower compartment portion 12, such filter means being indicated generally by the numeral 71. The oil collects in the various lower compartments and may then be discharged through the opening means 72, there being a separate discharge means communicated with each lower compartment whereby separated oil from each flow stream may be conveyed to a collection or gauging means. It it to be noted that opening means 72 is connected into housing 7 at the upper end of each of the lower compartments.

Figure 3:
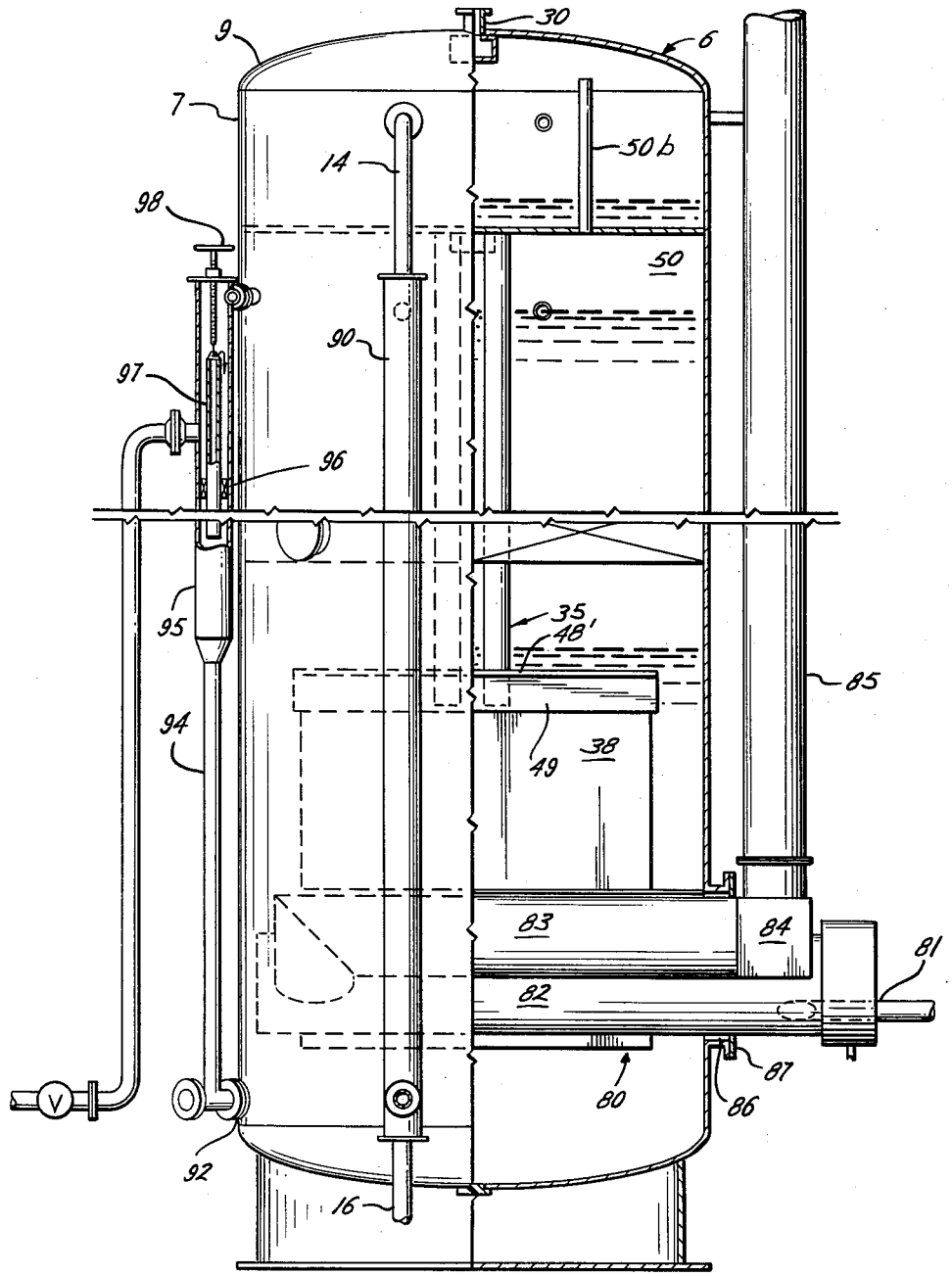
FIG. 3 is a one-quarter sectional view on the line 3—3 of FIG. 1 which illustrates in further detail the various components of the treater of the present invention and their relationship to each other.

To further aid in separating the oil and the water, suitable heater means as indicated at 80 may be employed. Any suitable heater means may be used, and as illustrated in FIG. 3 of the drawings, such heater means is provided with a burner 81 which may burn natural gas or any other combustible material and the gases of combustion are conveyed through the tube 82 which extends laterally in the bottom portion 13 of the housing 7 and then through the tubes 83 which communicate with the tube 82 at one end thereof and extend parallel to and adjacent the tube 82 as shown in FIGS. 2 and 3 of the drawings. The tubes 83 are connected into header 84 on the outside of the housing, and a stack 85 is connected into the header 84 for suitable discharge of the flue gases. The tubes 82 and 83 extend into the housing 7 through an opening 86 in the bottom portion 13 of the housing 7. The opening 86 may be closed off by any suitable closure as shown at 87. The heater means 80 in the lower portion 13 of the housing 7 serves to heat the liquids in the bottom portion 13 of the housing to further aid in separating the oil and water from each other. It will be noted that the arrangement of the lower compartment portion 12 relative to the heater 80 is such that all lower compartments may be simultaneously heated while requiring only one heater means 80. Any heat transmitted to the oil may be in turn utilized to heat the incoming liquids by means of the enlarged tube 90 which surrounds each of the inlet conduits 14, as shown in FIGS. 1, 2 and 3. The enlarged tube 90 communicates with the discharge oil outlets 72 whereby any heat in the oil discharged through openings 72 may be heat exchanged with the incoming liquid stream as it is conveyed to the upper compartment portion 11 of the treater 6.

Suitable means are provided for retaining a predetermined amount of water within the bottom portion of the housing 7 at all times to preclude the discharge of oil from any one of the downcomer means 35, or from the lower compartments through the water outlet illustrated at 92. Such means are illustrated in greater detail in FIG. 3 and include the conduit 94 which is connected into the outlet 92 and extends upwardly along the housing 7. The conduit 94 is provided with an enlarged portion 95 in which is secured the piston or packer 96 through which extends the hollow rod 97. The hollow rod 97 may be adjusted vertically in the packer 96 secured in enlarged portion 95 by means of the hand wheel 98 which is connected to the upper end of the hollow rod 97 as shown in FIG. 3 of the drawings. The vertical position of the hollow rod 97 determines the level of water within the container 7 and forms a weir to inhibit excessive discharge of the water from the bottom treating vessel 6.

Preferably, the water-oil interface level is maintained, as illustrated in FIG. 2, above the plate 48 to increase the amount of dispersion of oil within the water and thereby increasing the amount of heat absorbed by the oil to thus increase the amount of water droplet coalescence.

While it is believed that the operation is apparent from the foregoing description, to further amplify and describe, it will be assumed that the present invention is positioned on a platform in a water covered area. Any suitable means may be used to position the housing 7 on the platform, and as illustrated in the drawings, suitable supports shown at 100 are provided for this purpose. A suitable number of inlets are provided for the wells, or for the producing formation of each well as desired whereby the various flow streams may be conducted separate into the housing 7 through its respective flow pipes 14, 15, 16 or 17. When the liquids are discharged into the upper compartment portion 11, they fall downwardly into a particular compartment, thereby releasing the gas from all of the flow streams which co-mingles in the upper end of the housing 7 and discharges through the open ended baffle 31 and out the outlet 30. The outlet 30 is connected to a suitable conduit for collection or discharge of the gases as desired.

The flow of the liquids into the compartments is maintained preferably at a rate so that a relatively thin layer of liquids is maintained on the bottom partition 26 in each compartment to further aid in separation of any entrained gases in the liquids from the various flow streams. The liquid from each flow stream is then conducted from each compartment through a downcomer tube 35 connected into the compartment and is discharged out the lower end of the downcomer tube 35 into the upper end of its respective open ended chamber 16. Oil separates by gravity and is guided by the deflector means 45 in a circuitous path as indicated by the arrow 70 to aid in separating the oil and water and flows into a particular lower compartment of the lower compartment portion 12 of the housing 7. The water separated flows out the lower open end 41 of each of the open ended chambers 16 and collects in the bottom portion 13 of the housing 7 to be subsequently discharged through the water discharge opening 72. The liquid level of the water in the bottom of housing 7 is maintained at a predetermined level by adjusting the hollow rod 97 in the enlarged portion 95 of the discharge conduit 94 whereby the rate of discharge of water is regulated. This fixes the level of water within the housing 7, and as previously noted, the level of water is preferably maintained slightly below the lower end of downwardly extending projection 49. The liquids in the bottom of the housing are heated by the heater 80, the heater 80 serving to heat all compartments within the housing simultaneously and it can be appreciated that the separated oil will pick up some of this heat as it flows around the deflector or baffle means 45 into its respective compartment of the lower compartment portion 12 of the housing 7. The heated oil is collected in each compartment and is discharged through the oil discharge 72 and passes through the enlarged tube 90 which surrounds the inlet conduits 14 for exchanging heat with the incoming liquids to further facilitate and enhance the separation of the gas, oil, and water from each other in the treater 6 in the foregoing manner as described.

In order to retain the gaseous vapors within the lower compartment portion 12 uniform, the partitions 50 and 51 may be slotted at their upper ends as illustrated at 50a, whereby the gas phase of all flow streams is co-mingled and then discharged through the tube 50b into the upper end of the housing 7 for subsequent discharge through the outlet 30.

It is important to note that since all of the water from the flow streams is combined, while keeping the oil from the multiple streams separate, such combined water is heated to provide a large heat mass which provides a unique way of transferring heat to the separate oil streams as compared to heating small separate quantities of water for each oil stream.

The present invention is also advantageous in that it enables a plurality of flow streams to be treated whereby various constituents in a stream may be simultaneously separated and thereafter separately collected and discharged from the treatment area in a particular manner. It also permits well fluids to be separated before metering or gauging. Also, it enables a maximum number of flow streams to be treated for separation of constituents within a minimum amount of space.

Broadly, the present invention relates to a treater, and more particularly, to a treater in which a plurality of flow streams may be treated for separating various liquids and gas phases thereof, and recovering the phases in a particular desired manner.

What is claimed is:

1. An apparatus for simultaneously treating a plurality of liquid flow streams having oil, water, and gas therein to separate the water and gas from the oil while retaining the oil in each of the liquid flow streams separated comprising, (a) a housing having side, upper, and lower end walls to form a substantially closed treating vessel,
   (b) inlet means adjacent the upper part of said housing for conducting each liquid flow stream into said housing,
   (c) means mounted in said housing to divide it into a plurality of separated upper compartments,
   (d) each of said inlet means being communicated with a different upper compartment whereby the liquid flow streams into said housing are retained separate,
   (e) said upper compartments communicating with the top of said housing whereby gas in the liquid flow streams may separate from the liquid,
   (f) said housing having an outlet to discharge the separated gas from said housing,
   (g) means mounted in said housing to divide it into a plurality of separated lower compartments,
   (h) partition means in each of said lower compartments forming a separate chamber in each of said lower compartments,
   (i) a separate conduit extending downwardly from each of said upper compartments to separately discharge the liquid from each of said upper compartments into a different chamber,
   (j) said chambers each having an upper end communicating with the lower compartment in which it is formed for discharging each liquid stream into a separate lower compartment,
   (k) said chambers each having a lower open end communicating with the bottom part of said housing for discharge of the water from all liquid streams thereinto,
   (l) heating means in the bottom part of said housing for imparting heat to the liquid in said chambers and lower compartments to aid in separating the oil from the water, and
   (m) outlet means for each of said lower compartments for discharge of the oil from each of said lower compartments.

2. The invention of claim 1 including deflection means in each of said lower compartments, said deflection means being spaced above the upper end of each of said chambers and extending radially inward from said housing side to aid in separating the oil from the water as they are discharged from each of said conduit means and into each of said chambers by directing the liquid flow toward the middle of the housing.

3. An apparatus for simultaneously treating a plurality of liquid flow streams having oil, water, and gas therein to separate the water and gas from the oil while retaining the oil in each of the liquid flow streams separated comprising, (a) a housing having side, upper, and lower end walls to form a substantially closed treating vessel,
   (b) inlet means adjacent the upper part of said housing for conducting each liquid flow stream into said housing,
   (c) means mounted in said housing to divide it into a plurality of separated upper compartments,
   (d) each of said inlet means being communicated with a different upper compartment whereby the liquid flow streams into said housing are retained separate,
   (e) said upper compartments communicating with the top of said housing whereby gas in the liquid flow streams may separate from the liquid,
   (f) said housing having an outlet to discharge the separated gas from said housing,
   (g) means mounted in said housing to divided it into a plurality of separated lower compartments,
   (h) partition means in each of said lower compartments forming a separate chamber in each of said lower compartments,
   (i) a separate conduit extending downwardly from each of said upper compartments to separately discharge the liquid from each of said upper compartments into a different chamber,
   (j) said chambers each having an upper end communicating with the lower compartment in which it is formed for discharging each liquid stream into a separate lower compartment,
   (k) said chambers having a lower open end communicating with the bottom part of said housing for discharge of the water from all liquid streams thereinto,
   (l) said lower compartment means each terminating at a point spaced above the bottom of said housing and below the upper end of each of said chambers,
   (m) outlet means for discharging the water from the bottom part of said housing,
   (n) means for restricting the discharge of water from the bottom part of said housing to retain a water level in said housing above the termination of said lower compartment means to prevent commingling of the oil in each liquid flow stream in each lower compartment, and
   (o) outlet means in said housing above the water level for each of said lower compartments for discharge of the oil from each of said lower compartments.

4. The invention of claim 3 including heating means in the bottom part of said housing for imparting heat to the liquid in said chambers and lower compartments to aid in separating the oil from the water.

5. The invention of claim 3 including deflector means in each of said lower compartments, said deflector means being spaced above the upper end of each of said chambers and extending radially inward from said housing side to aid in separating the oil from the water as they are discharged from each of said conduit means and into each of said chambers by directing the liquid flow toward the middle of the housing.

References Cited in the file of this patent

UNITED STATES PATENTS

| | | |
|---|---|---|
| 1,705,669 | Kobernik | Mar. 19, 1929 |
| 2,614,649 | Walker et al. | Oct. 21, 1952 |
| 2,619,187 | Hayes et al. | Nov. 25, 1952 |
| 2,664,963 | Lovelady et al. | Jan. 5, 1954 |